United States Patent
Deng et al.

(10) Patent No.: US 9,030,803 B2
(45) Date of Patent: May 12, 2015

(54) ELECTROCHEMICAL ENERGY STORAGE SYSTEM

(75) Inventors: Ming Jay Deng, Hsinchu (TW); Jeng Kuei Chang, Hsinchu (TW); Jin Ming Chen, Hsinchu (TW); Kueih Tzu Lu, Hsinchu (TW)

(73) Assignee: National Synchrotron Radiation Research Center, Hsinchu (TW)

(*) Notice: Subject to any disclaimer, the term of this patent is extended or adjusted under 35 U.S.C. 154(b) by 0 days.

(21) Appl. No.: 13/480,224

(22) Filed: May 24, 2012

(65) Prior Publication Data

US 2013/0163145 A1    Jun. 27, 2013

Related U.S. Application Data

(60) Provisional application No. 61/579,495, filed on Dec. 22, 2011.

(51) Int. Cl.
*H01G 9/00* (2006.01)
*H01G 9/02* (2006.01)
(Continued)

(52) U.S. Cl.
CPC .......... *H01G 11/06* (2013.01); *H01G 11/28* (2013.01); *H01G 11/46* (2013.01); *H01G 11/62* (2013.01); *B82Y 30/00* (2013.01); *Y02E 60/13* (2013.01)

(58) Field of Classification Search
CPC ......... H01G 9/155; H01G 9/058; Y02E 60/13
USPC ......................................... 361/502, 503, 504
See application file for complete search history.

(56) References Cited

U.S. PATENT DOCUMENTS 8,426,067 B2    4/2013 Tsukada

2004/0157121 A1*    8/2004 Watanabe et al. ............. 429/185
(Continued)

FOREIGN PATENT DOCUMENTS

CN        1430306 A        7/2003
CN        102187413        9/2011
(Continued)

OTHER PUBLICATIONS

Chen, Ren-Jie; Wu, Feng; Liang, Hong-Ying; Mao, Li-Cai, "Binary Molten Salt Electrolytes Based on LiClO4 with Acetamide or Ethyleneurea", 2004; Bejing Daxue Chubanshe, 1000-6818, 323-326.*

(Continued)

*Primary Examiner* — Eric Thomas
*Assistant Examiner* — Arun Ramaswamy
(74) *Attorney, Agent, or Firm* — Ming Chow; Sinorica, LLC

(57) ABSTRACT

An electrochemical energy storage system includes a positive electrode, a negative electrode disposed proximally to and not in contact with the positive electrode, and a non-aqueous electrolyte, wherein the positive electrode and the negative electrode are immersed in the non-aqueous electrolyte, and a case is presented in the energy storage system to accommodate the non-aqueous electrolyte, the positive electrode, and the negative electrode. The positive electrode has a porous matrix having a plurality of micrometer sized pores and nanostructured metal oxides, wherein the porous matrix is a 3-dimensional (3D) mesoporous metal or a 3D open-structured carbonaceous material, and the nanostructured metal oxides are coated inside the plurality of pores of the porous matrix. The non-aqueous electrolyte includes organic salts having acylamino group and lithium salts characterized as LiX, wherein Li is lithium and X comprises $ClO_4^-$, $SCN^-$, $PF_6^-$, $B(C_2O_4)_2^-$, $N(SO_2CF_3)_2^-$, $CF_3SO_3^-$, or the combination thereof.

2 Claims, 12 Drawing Sheets

(51) Int. Cl.
*H01G 11/06* (2013.01)
*H01G 11/62* (2013.01)
*H01G 11/28* (2013.01)
*H01G 11/46* (2013.01)
*B82Y 30/00* (2011.01)

(56) References Cited

U.S. PATENT DOCUMENTS

| 2006/0196410 | A1 |   | 9/2006 | Hishitani |         |
|--------------|-----|---|--------|-----------|---------|
| 2007/0099090 | A1 | * | 5/2007 | Oh et al. | 429/339 |
| 2008/0003503 | A1 | * | 1/2008 | Kawakami et al. | 429/231.5 |
| 2011/0014523 | A1 |   | 1/2011 | Park      |         |

FOREIGN PATENT DOCUMENTS

| JP | 2002-158140 | 5/2002 |
| JP | 2004-296108 | 10/2004 |
| JP | 2007-182360 | 7/2007 |
| JP | 2009-512156 | 3/2009 |
| JP | 2010-103051 | 5/2010 |
| JP | 2011-510448 | 3/2011 |
| JP | 2002-158140 | 5/2012 |
| WO | WO 2010019648 A2 * | 2/2010 |

OTHER PUBLICATIONS

Xu, Bin et al.; "Mesoporous Activated Carbon Fiber as Electrode Material for High Performance Electrochemical Double Layer Capacitors with Ionic Liquid Electrolyte", 2010, vol. 195, pp. 2118-2124.*

Li, Qi et al; "The Preparation and Properties of a Novel Electrolyte of Electrochemical Double Layer Capacitors based on LiPF6 and Acetamide", 2011, Electrochimica Acta, vol. 58, pp. 330-335.*

Japanese Office Action for Japanese patent application No. 2012-254004.

Foreign Office Action for application No. 101137613 filed in Taiwan, issued on Apr. 3, 2014.

Ming-Jay Deng, Jeng-Kuei Chang, Cheng-Chia Wang, Kai-Wen Chen, Chih-Ming Lin, Mau-Tsu Tang, Jin-Ming Chen, and Kueih-Tzu Lu. High-performance electrochemical pseudo-capacitor based on MnO2 nanowires/Ni foam as electrode with a novel Li-ion quasi-ionic liquid as electrolyte. Energy & Environmental Science, 2011, 4, 3942-3946.

Japanese Office Action for Japanese patent application No. 2012-254004, issued on Jul. 1, 2014.

* cited by examiner

ELECTROCHEMICAL ENERGY STORAGE SYSTEM

The current application claims a priority to the U.S. 61/579,495 filed on Dec. 22, 2011.

BACKGROUND OF THE INVENTION

1. Technical Field

The present invention relates to an electrochemical energy storage system, and more particularly, to a supercapacitor comprising nanostructured metal oxide deposited on metal foam or carbon paper as an electrode and lithium-containing quasi-ionic liquid as electrolyte.

2. Background

Applications for electrochemical energy storage are expanding rapidly as demand grows in various areas including green energy storage and electric-powered transportation. Electrochemical capacitors (ECs) show good potential for high-power applications, but have lower energy density than lithium batteries. As both energy and power densities of a supercapacitor relate to the square of the operating voltage, an electrolyte with a large potential domain of stability is crucial. Conventional aqueous electrolyte typically exhibits a potential domain of 1V, limiting its capacitor cell voltage. Non-aqueous electrolytes such as organic solvents do not allow the cell to be operated at high temperatures due to their volatile, flammable, and thermally and electrochemically unstable nature.

The overall performance of a supercapacitor depends not only on the selection of electrolytes but also on the selection of electrode materials. For application in a range of energy storage devices, $MnO_2$ has been extensively investigated as a promising electrode material because of its high energy density, low cost, minimal environmental impact, and natural abundance. ECs with $MnO_2$ films as negative electrode and ionic liquid as electrolyte have been investigated and recorded in various prior arts. The research discovered that the cations such as n-butyl-n-methylpyrrolidinium, 1-ethyl-3-methylimidazolium, and 1-butyl-3-methyl-imidazolium adsorb only on the electrode surface and do not penetrate into the [$MnO_6$] octahedral framework. Moreover, in non-aqueous electrolytes, the variation of the oxidation state of Mn in a $MnO_2$ electrode is approximately 0.4, which is smaller than that (~0.7) observed in aqueous electrolytes.

A small variation in the Mn oxidation state implies that a low percentage of Mn in the structures has undergone reduction-oxidation (redox) reaction, indicating a low rate of ion insertion. This condition is also associated with low electronic and ionic conductivity of $MnO_2$, which kinetically limits the rapid faradaic redox reactions in the bulk materials.

Therefore, the development of a new electrolyte having a large potential domain and a high stability under high temperature is required, and a new electrode with properties that enhance penetration of an electrolyte to compensate the low redox reaction among the charge/discharge cycle is also necessary. Essentially, the desired $MnO_2$ electrode should have better electronic and ionic conductivity. The present invention discloses materials and specific structures to solve the above-mentioned problems in order to improve the capacity performance of conventional ECs.

In the present invention, the maximum energy density of 300 to 450 W h $kg^{-1}$ obtained from 3D porous metal oxides as an electrode in ionic liquid electrolyte-based EC is notably higher than those of symmetrical (or asymmetrical) ECs based on grapheme ECs (2.8 to 136 W h $kg^{-1}$), $MnO_2$ nanowire/grapheme composite (MNGC) ECs (30.4 W h $kg^{-1}$), activated carbon ECs (<10 W h $kg^{-1}$), or $MnO_2$ nano spheres/carbon nanotubes/polymer composite as an electrode. Moreover, the embodiment of the present invention exhibits a superior power density (~60 kW $kg^{-1}$ at 70 to 120 W h $kg^{-1}$) and acceptable cycling performance of ~95% retention after 500 cycles.

SUMMARY

One embodiment of the present invention discloses a non-aqueous electrolyte for an electrochemical energy storage system, comprising: organic salts having acylamino group and lithium salts characterized as LiX, wherein Li is lithium and X comprises $ClO_4^-$, $SCN^-$, $PF_6^-$, $B(C_2O_4)_2^-$, $N(SO_2CF_3)_2^-$, $CF_3SO_3^-$, or the combination thereof.

Another embodiment of the present invention discloses an electrode of an electrochemical energy storage system, comprising: a porous matrix having a plurality of micrometer sized pores and nanostructured metal oxides, wherein the porous matrix is a 3-dimensional (3D) mesoporous metal or a 3D open-structured carbonaceous material, and the nanostructured metal oxides are coated inside the plurality of pores of the porous matrix.

Another embodiment of the present invention discloses an electrochemical energy storage system, comprising a positive electrode, a negative electrode disposed proximally to and not in contact with the positive electrode, and a non-aqueous electrolyte, wherein the positive electrode and the negative electrode are immersed in the non-aqueous electrolyte, and a case is presented in the energy storage system to accommodate the non-aqueous electrolyte, the positive electrode, and the negative electrode. The positive electrode has a porous matrix having a plurality of micrometer sized pores and nanostructured metal oxides, wherein the porous matrix is a 3-dimensional (3D) mesoporous metal or a 3D open-structured carbonaceous material, and the nanostructured metal oxides are coated inside the plurality of pores of the porous matrix. The non-aqueous electrolyte includes organic salts having acylamino group and lithium salts characterized as LiX, wherein Li is lithium and X comprises $ClO_4^-$, $SCN^-$, $PF_6^-$, $B(C_2O_4)_2^-$, $N(SO_2CF_3)_2^-$, $CF_3SO_3^-$, or the combination thereof.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The objectives and advantages of the present invention are illustrated with the following description and upon reference to the accompanying drawings in which.

DETAILED DESCRIPTION

Figure 1:
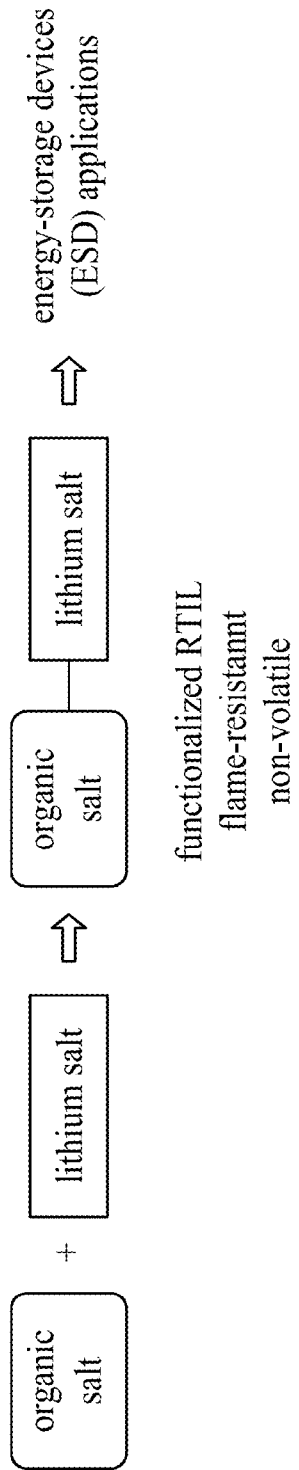
FIG. 1 shows the reaction block diagram of the binary mixture used as an electrolyte according to one embodiment of the present invention.

One embodiment of the present invention discloses electrodeposited nanostructured metal oxides on metal foam or carbon fiber paper as electrodes coupled with novel Li-ion ionic liquids (IL) as electrolytes. As shown in FIG. 1, the IL in this embodiment was prepared by lithium-containing salts and organic salts, wherein the reactants (i.e., lithium-containing salts and organic salts) are in solid state powder before the reaction, and are transformed into a liquid state after the formation of the functionalized room temperature ionic liquid (RTIL). The RTIL is non-volatile and thus flame-resistant compared to the conventional propylene carbonate (PC) and ethyl carbonate (EC) electrolytes, which are volatile and flammable when implemented in the conventional energy storage device.

Figure 2:
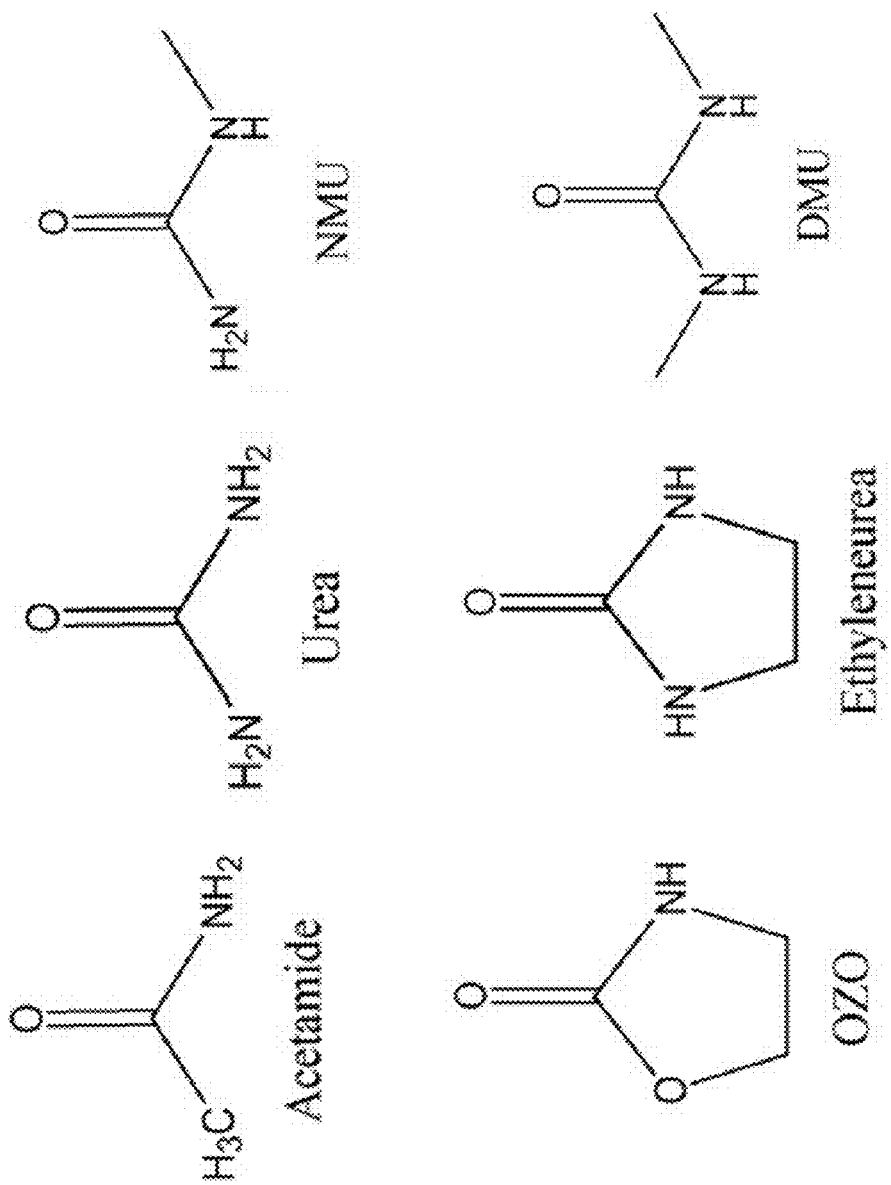
FIG. 2 lists the chemical formula of the organic molecules constituting the electrolyte according to one embodiment of the present invention.

The organic salts in the embodiments of the present invention comprise acylamino group, which is a functional group having a carbon atom double bonded with an oxygen atom, and single bonded with a nitrogen atom. As shown in FIG. 2, the selection of the organic salts includes, but is not limited to, acetamide, urea, methylurea (NMU), 2-oxazolidinone (OZO), ethyleneurea, and 1,3-dimethylurea DMU. The above-mentioned selection comprises cyclic compounds, such as OZO, ethyleneurea, and acyclic compounds, such as acetamide, urea, NMU, and DMU. The organic salts disclosed in the embodiments of the present invention can be readily purchased at low cost from chemical dealers. Compared to organic salts, such as urea and acetamide, used in the conventional electrolyte, the organic salts used in the present invention are commercially ready and do not require any complex synthesis or purification processes, and are therefore lower in cost.

The lithium-containing salts in the embodiments of the present invention comprise, but are not limited to, $LiClO_4$, $LiSCN$, $LiPF_6^-$, $LiB(C_2O_4)_2$, $LiN(SO_2CF_3)_2$, or $LiCF_3SO_3$, wherein the $LiN(SO_2CF_3)_2$ is also known as lithium bis(trifluoromethylsulfony)imide (LiTFSI). In several preferred embodiments of the present invention, the ranges of molar ratios (ratio of lithium-containing salt to the organic salts) of the facile binary mixture are listed in the following table:

| Lithium Salts:Organic Salts | Range of Molar Ratios |
|---|---|
| $LiClO_4$:acetamide | 1:4.2~1:5.2 |
| $LiClO_4$:urea | 1:3.1~1:4.1 |
| $LiClO_4$:ethyleneurea | 1:4.2~1:5.2 |
| $LiClO_4$:OZO | 1:4.2~1:4.5 |
| $LiClO_4$:DMU | 1:4.2 |
| $LiClO_4$:NMU | 1:3.1~1:4.1 |
| LiSCN:OZO | 1:4.2~1:6.2 |
| LiSCN:acetamide | 1:4.2~1:6.2 |
| LiSCN:ethyleneurea | 1:4.2~1:5.2 |
| LiSCN:DMU | 1:4.2 |
| LiSCN:NMU | 1:3.2~1:4.2 |
| LiTFSI:acetamide | 1:4.2~1:6.2 |
| LiTFSI:urea | 1:3.2~1:4.2 |
| LiTFSI:OZO | 1:3.2~1:6.2 |
| LiTFSI:ethyleneurea | 1:4.2 |
| $LiPF_6$:acetamide | 1:4.2~1:6.2 |
| $LiPF_6$:urea | 1:3.2~1:4.2 |
| $LiPF_6$:OZO | 1:4.2~1:6.2 |
| $LiPF_6$:ethyleneurea | 1:4.2~1:5.2 |

Figure 3:
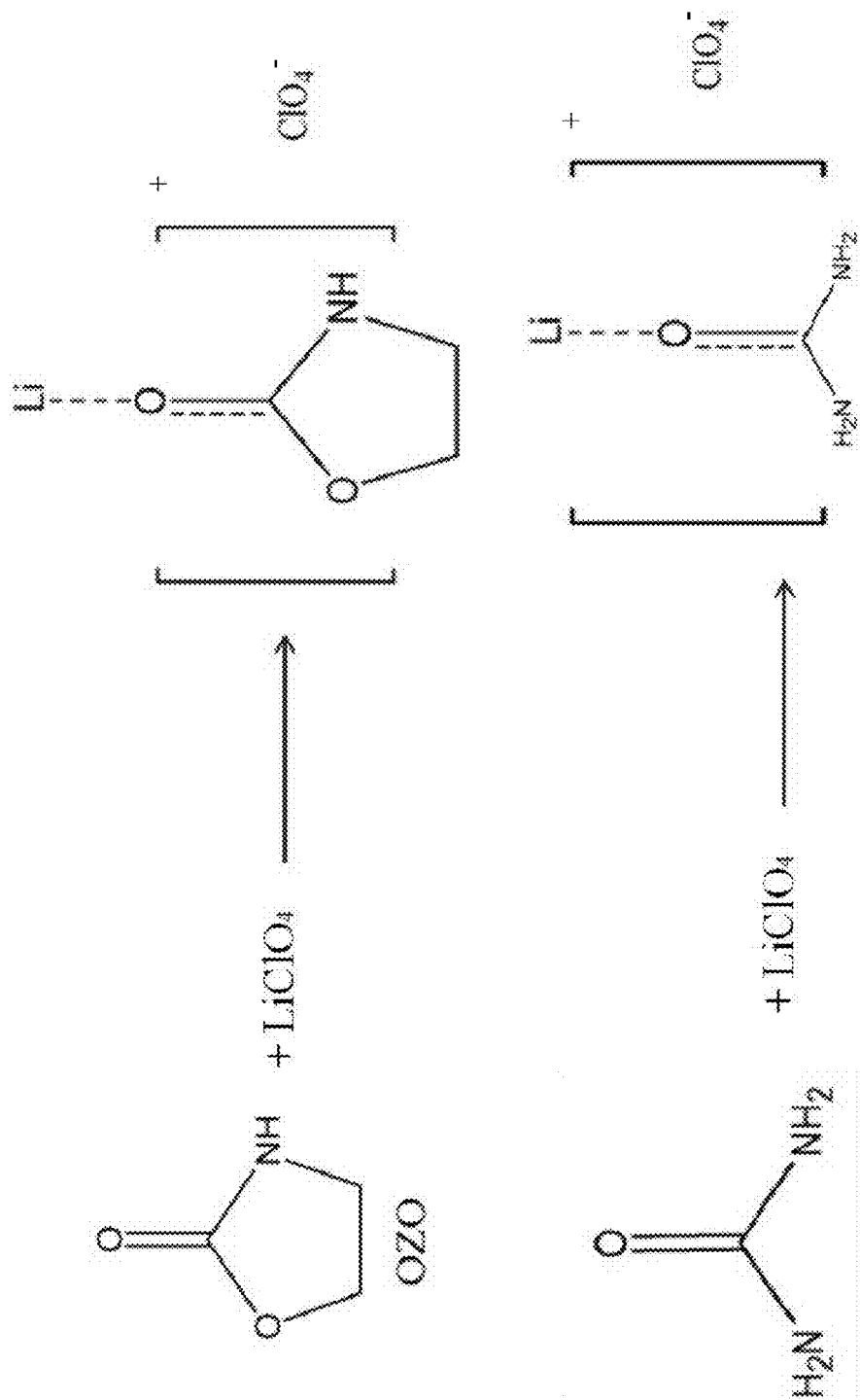
FIG. 3 presents the reaction forming the electrolyte in chemical formula according to one embodiment of the present invention.

In one embodiment of the present invention, the electrolyte composed of $LiClO_4$ and OZO with molar ratio 1:4.2 was prepared from $LiClO_4$ (Acros Inc., AP) and OZO (Acros Inc., 99%), which were dried at 110 and at 55 for 12 hours in vacuum, respectively. The melting and boiling points of OZO are 89 and 220, respectively. The content of water in the electrolyte was determined to be less than 80 ppm with a Karl-Fischer titration. As shown in FIG. 3, the reaction presented in chemical formula demonstrates the mixing of OZO and $LiClO_4$ and the formation of the RTIL $LiClO_4$:OZO. The product shows the lithium ion transferred onto the OZO and connected through a π-bond, and the anion $ClO_4^-$ is proximal to the cation counterpart due to the Coulomb force. The reaction of $LiClO_4$:urea, which is implemented in another embodiment of the present invention, is also shown in FIG. 3.

The positive electrode in the embodiments of the present invention comprises a porous matrix having a plurality of micrometer sized pores and nanostructured metal oxides, wherein the porous matrix is a 3-dimensional (3D) mesoporous metal or a 3D open-structured carbonaceous material, and the nanostructured metal oxides are coated inside the plurality of pores of the porous matrix. The 3D mesoporous metal includes, but is not limited to, nickel foam or titanium foam; whereas the 3D open-structured carbonaceous material includes, but is not limited to, carbon fiber papers. The nanostructured metal oxides disposed thereon include, but are not limited to, transitional metal oxide nanostructure, for example, $MnO_2$ nanowires and $V_2O_5$ nanosheets. In one embodiment of the present invention, the nanostructured metal oxides include $MnO_2$ nanoparticles, $MnO_2$ nanosheets, $V_2O_5$ nanoparticles, and $V_2O_5$ nanowires.

Figure 4:
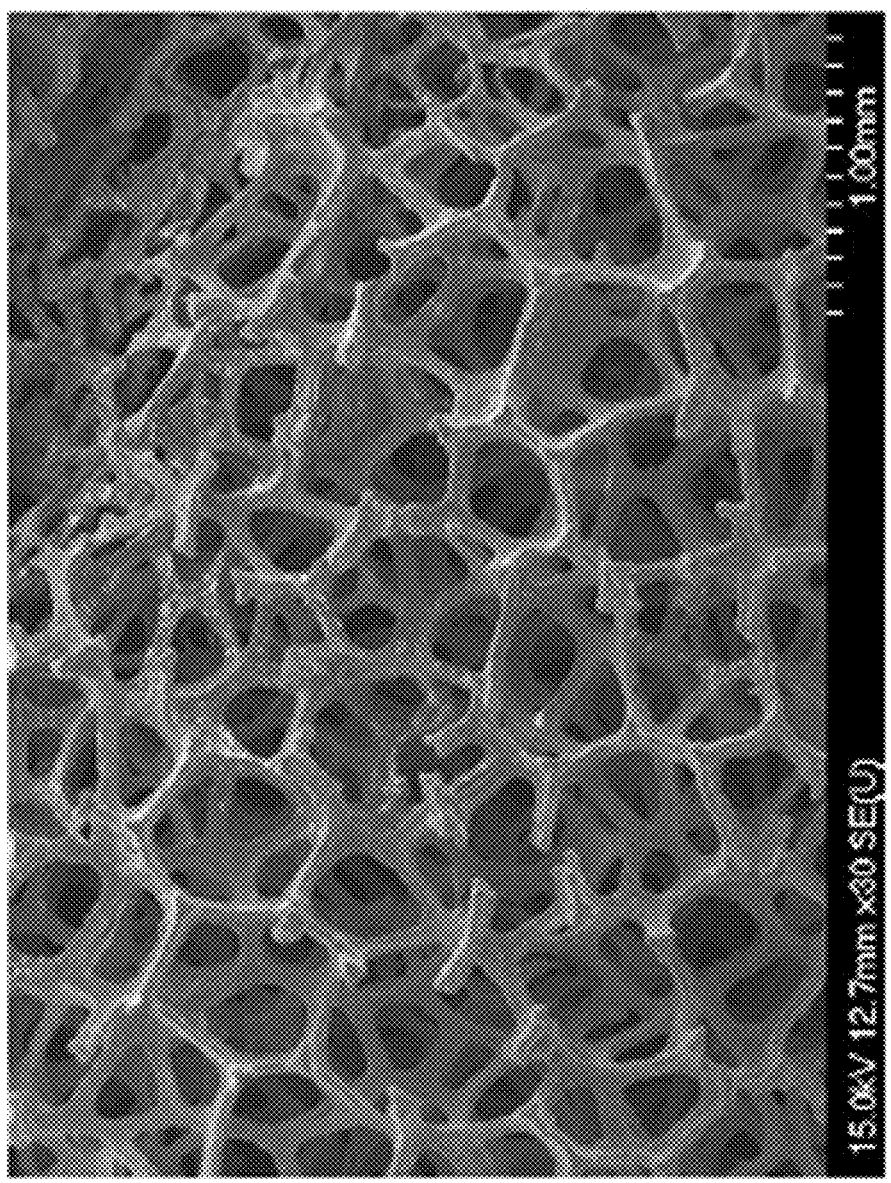
FIG. 4 shows a scanning electron microscopy (SEM) image of nickel foam according to one embodiment of the present invention.
Figure 5:
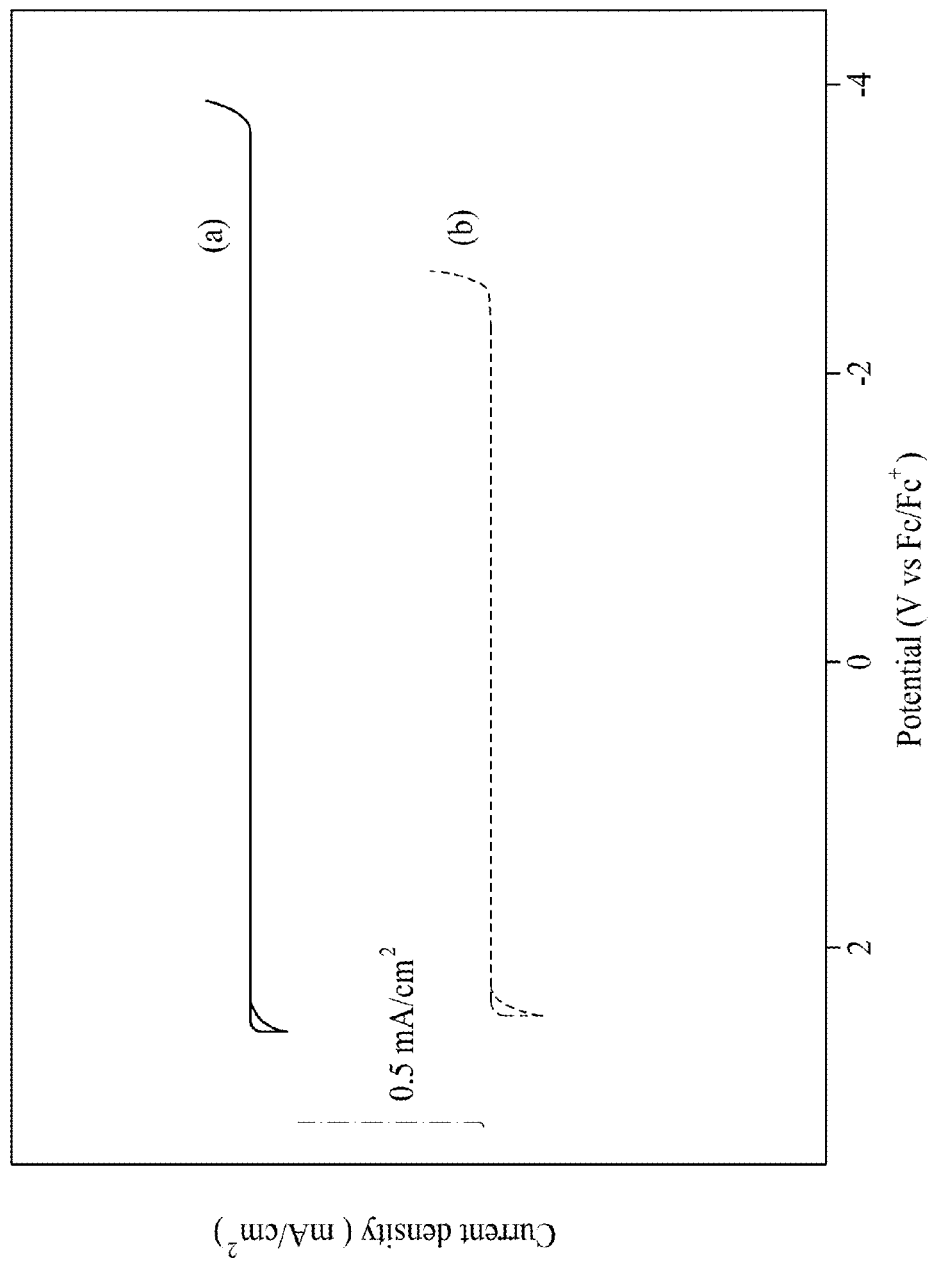
FIG. 5 shows a cyclic voltammogram (CV) of a blank nickel foam according to one embodiment of the present invention.

FIG. 4 shows a scanning electron microscopy (SEM) image of nickel foam that exhibits a uniform and 3D cross-linked grid structure. The SEM image of the nickel foam shows a pore size in a range of from 100 μm to 500 μm. The electrochemical properties of the nickel foam in LiTFSI-acetamide IL and LiTFSI-urea IL were recorded with cyclic voltammetry (CV) at a scan rate of 50 mV/s and a temperature of 303K in an argon-purified glove box, wherein both moisture and oxygen content were maintained below 1 ppm. A platinum wire as a reference electrode was placed in a fitted glass tube containing N-butyl-N-methyl-purrolidinium-TFSI IL with a ferrocene/ferrocenium couple as a potential standard (Fc/Fc$^+$=50/50 mol %, potential +0.55V vs. saturated calomel electrode). A spiral platinum wire as a counter electrode was directly immersed in the bulk LiTFSI-acetamide IL and LiTFSI-urea IL. The applied current and potential were regulated with a potentiostat. As shown in FIG. 5, a cyclic voltammogram (CV) of blank nickel foam was recorded in a) LiTFSI-acetamide IL electrolyte and b) LiTFSI-urea IL electrolyte. The potential stability windows of 6V in a) and 5V in b) are much wider than that exhibited in the conventional aqueous solution, typically 1V. FIG. 5 shows that these ILs are promising electrolytes for a device to store energy with a large cell voltage.

Figure 6:
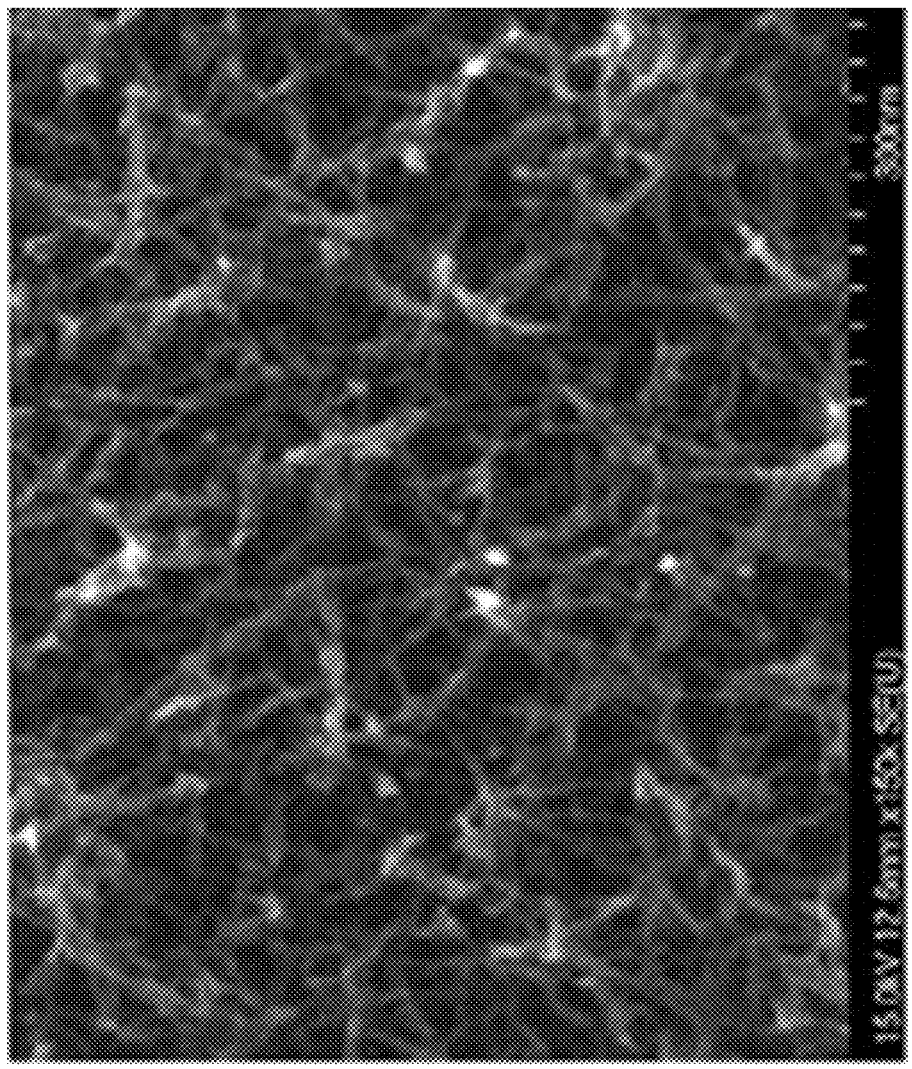
FIG. 6 displays an SEM image of $MnO_2$ nanowires electrodeposited on to the surface of the nickel foam according to one embodiment of the present invention.
Figure 7:
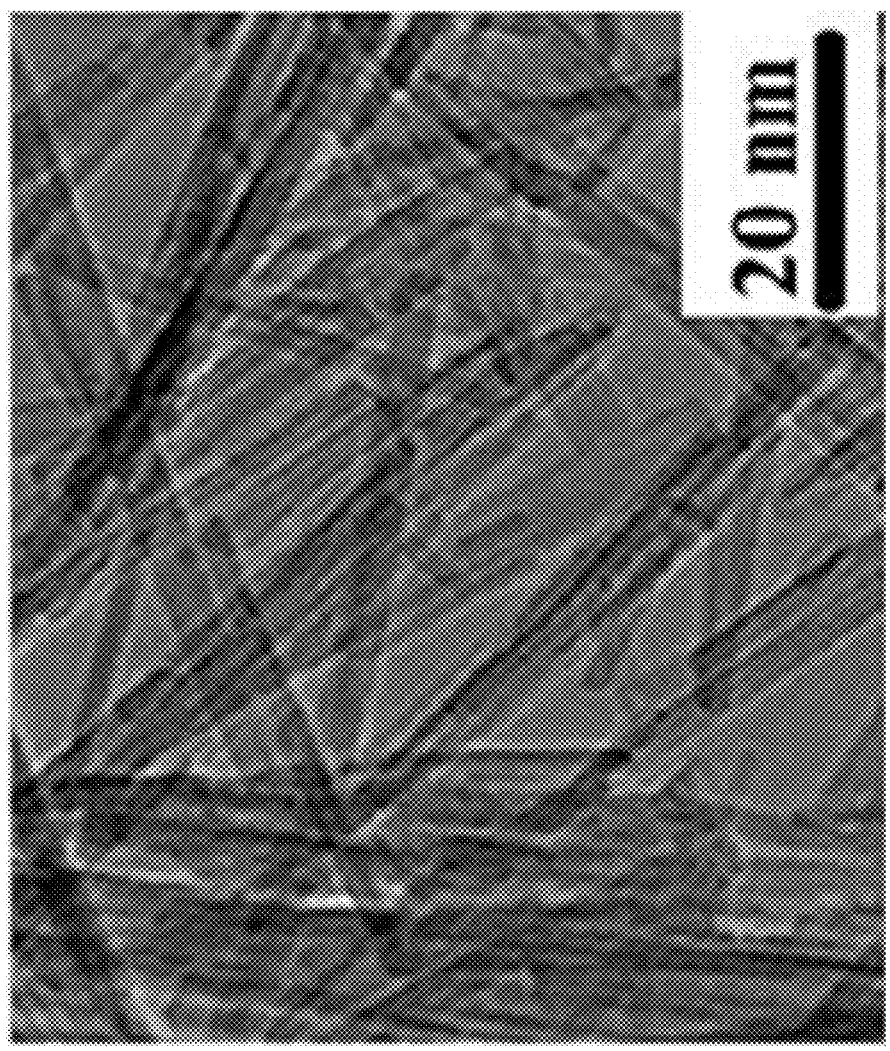
FIG. 7 shows a transmitted electron microscopy (TEM) image of $MnO_2$ nanowires according to one embodiment of the present invention.

FIG. 6 displays an SEM image of $MnO_2$ nanowires electrodeposited onto the surface of the nickel foam as shown in FIG. 4. As noted, $MnO_2$ nanowires are loosely dispersed on nickel foam forming a 3D and porous superstructure. A typical transmitted electron microscopy (TEM) image of $MnO_2$ nanowires appears in FIG. 7, and shows the magnesium oxide composed of numerous interweaving nanowires having diameters of about 10 nm and lengths of up to hundreds of nanometers.

In one embodiment of the present invention, during preparation of the $MnO_2$ nanowires on nickel foam (MNNF) superstructure, magnesium oxide was deposited anodically from $Mn(CH_3COO)_2$ aqueous plating solution (0.25 M) at room temperature, using a three-electrode electrochemical system. Nickel foam having an area of 1 cm$^2$ was pretreated by degreasing in acetone, etching in hydrochloric acid, rinsing with water, soaking in 0.01 M $MnCl_2$ for 4 hours, and rinsing again thoroughly with water; after drying, the nickel foam served as the working electrode. A platinum sheet and a saturated calomel electrode (SCE) were assembled as the counter and reference electrodes, respectively. The electrodeposition was performed under a constant potential 0.45V vs. SCE to give a total passed charge density of 0.4 Coulomb s/cm$^2$. The typical mass density of the deposited $MnO_2$, measured with a microbalance having an accuracy of 0.01 mg, was approximately 0.3 mg cm$^{-2}$. In other embodiments of the present invention, the above-mentioned preparation process can also be applied to other nanostructured metal oxide-coated metal foams with different electrodepositing potentials.

Figure 8:
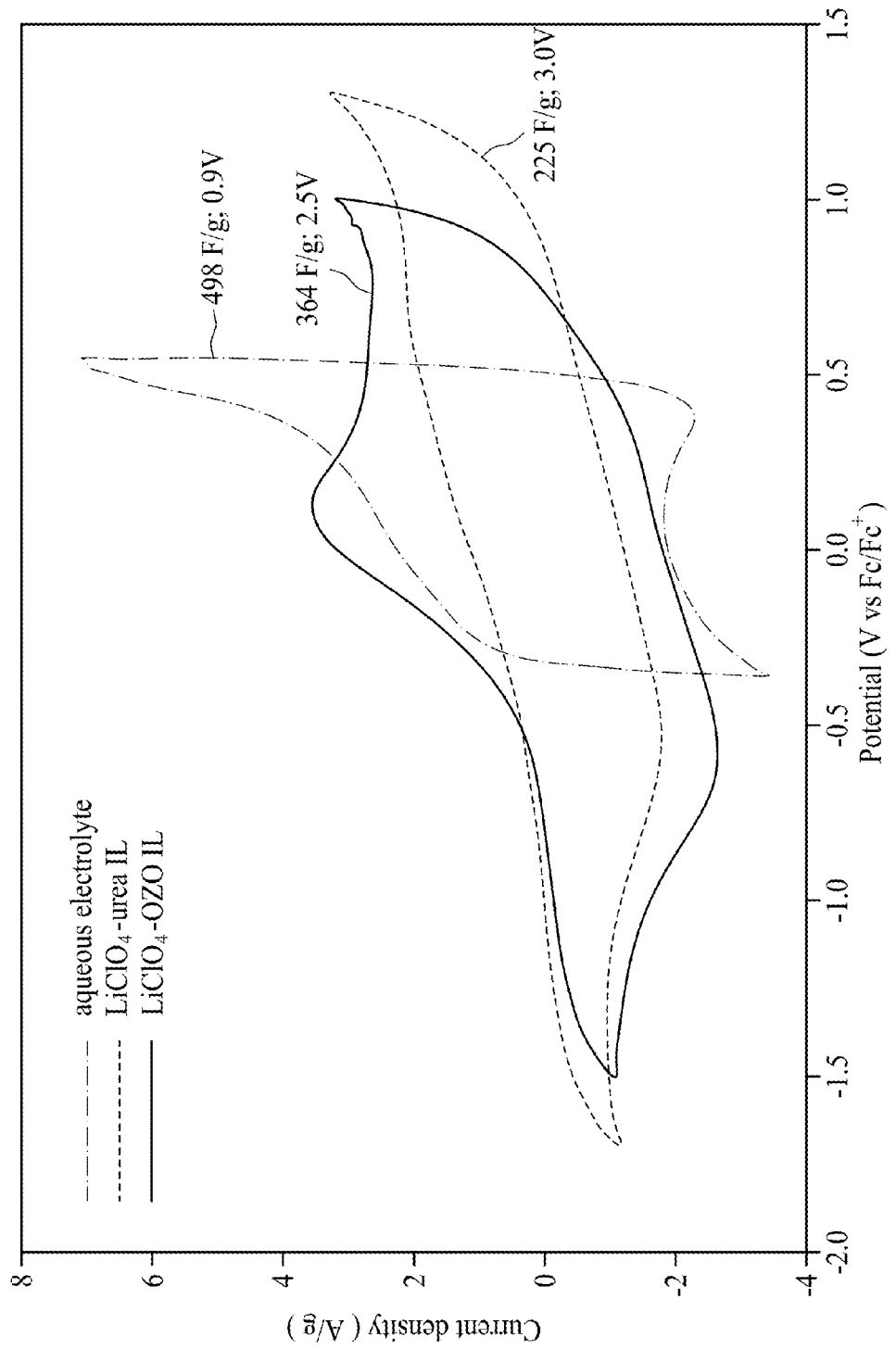
FIG. 8 shows cyclic voltammograms of $MnO_2$ nanowires on nickel foam (MNNF) in the aqueous electrolyte, the $LiClO_4$-urea ionic liquid, and the $LiClO_4$-OZO ionic liquid according to one embodiment of the present invention.

The electrochemical properties of the MNNF in various electrolytes were recorded with cyclic voltammetry (CV). A platinum wire as a reference electrode was placed in a fitted glass tube containing N-butyl-N-methyl-purrolidinium-TFSI IL with a ferrocene/ferrocenium couple as a potential standard (Fc/Fc$^+$=50/50 mol %, potential +0.55V vs. SCE). A spiral platinum wire as a counter electrode was directly immersed in the ILs. In FIG. 8, three cyclic voltammograms of an MNNF in the a) aqueous electrolyte (498 F g$^{-1}$, 0.9 V), b) $LiClO_4$-urea IL (364 F g$^{-1}$, 2.5 V), and c) $LiClO_4$-OZO IL (225 F g$^{-1}$, 3 V) are shown. Irreversible cathodic and anodic reactions were observed at different ranges of the operating potential. The operating potential region of about 0.9V is presented for the aqueous electrolyte; 2.5V for the $LiClO_4$-OZO IL electrolyte; and 3.0V for the $LiClO_4$-urea IL electrolyte. However, there is room to improve the performance in terms of energy, power densities, safety, and cycle life of the state-of-the-art electrochemical capacitors. The energy density (E) and power density (P) of an electrochemical capacitor are governed by the following equations:

$$E=(C(\Delta V)^2)/2 \quad (1)$$

$$P=E/t, \quad (2)$$

where C is capacitance, $\Delta$ V is cell voltage, and t is the discharging time. The applicable potential window of manganese oxide ($MnO_2$) in IL, approximately 2.5 V~3 V, is three times more than that found in traditional aqueous electrolytes. This allows the ECs to operate at a higher cell voltage, and therefore, the energy and power densities are improved. The quasi-rectangular response of the CV shape is attributed to a continuous and reversible $Mn^{3+}/Mn^{4+}$ faradaic redox reaction of $MnO_2$ nanowires over the potential ranges of different electrolytes.

Embodiment 1

One embodiment of the chemical energy storage system in the present invention comprises a positive electrode composed of MNNF; a negative electrode composed of inert graphite disposed proximal to, but not in contact with, the MNNF electrode; a non-aqueous electrolyte including OZO and $LiClO_4$; and a case accommodating the non-aqueous electrolyte, the positive electrode, and the negative electrode. The preparation of the MNNF electrode is described above, and includes application of a constant potential of 0.45V vs. SCE during the electrodeposition process.

Figure 9:
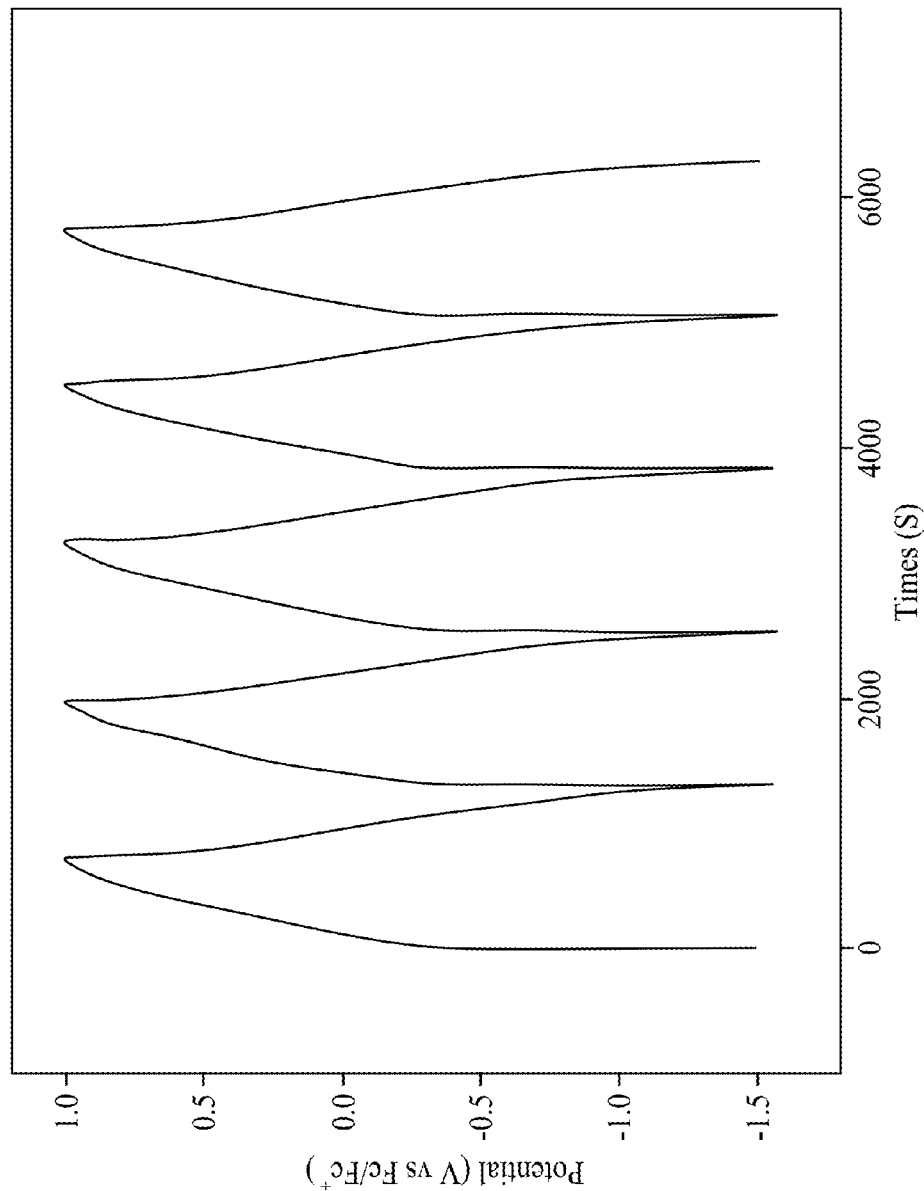
FIG. 9 shows a chronopotentiogram (CP) of the MNNF electrode for charge-discharge cycles in an applied potential from $-1.5V$ to $+1.0V$ and an applied current density of $\mp 1.5$ A $g^{-1}$ according to one embodiment of the present invention.

The electrochemical properties of the MNNF electrode in $LiClO_4$-OZO IL were recorded with a chronopotentiogram (CP). The obtained CP of the MNNF electrode for charge-discharge cycles in an applied potential from −1.5V to +1.0V and an applied current density of ∓1.5 A g$^{-1}$ is shown in FIG. 9. The MNNF electrode exhibits enduring electrochemical stability, that is, the charge/discharge cycling induces a barely noticeable degradation of its 3D porous superstructure. The high electrode operating potential 2.5V in the $LiClO_4$-OZO IL allows a superior energy density of 304 W h kg$^{-1}$ of the capacitor because the energy density relates mainly to the square of the cell operating voltage.

Embodiment 2

Another embodiment of the chemical energy storage system in the present invention comprises a positive electrode composed of $V_2O_5$ nanosheets and titanium foam; a negative electrode composed of inert graphite disposed proximal to, but not in contact with, the positive electrode; a non-aqueous electrolyte including acetamide and $LiClO_4$; and a case accommodating the non-aqueous electrolyte, the positive electrode, and the negative electrode. The preparation of the $V_2O_5$ nanosheets-coated titanium electrodes are described above, and includes application of a constant potential of 0.65V vs. SCE during the electrodeposition process.

Figure 10:
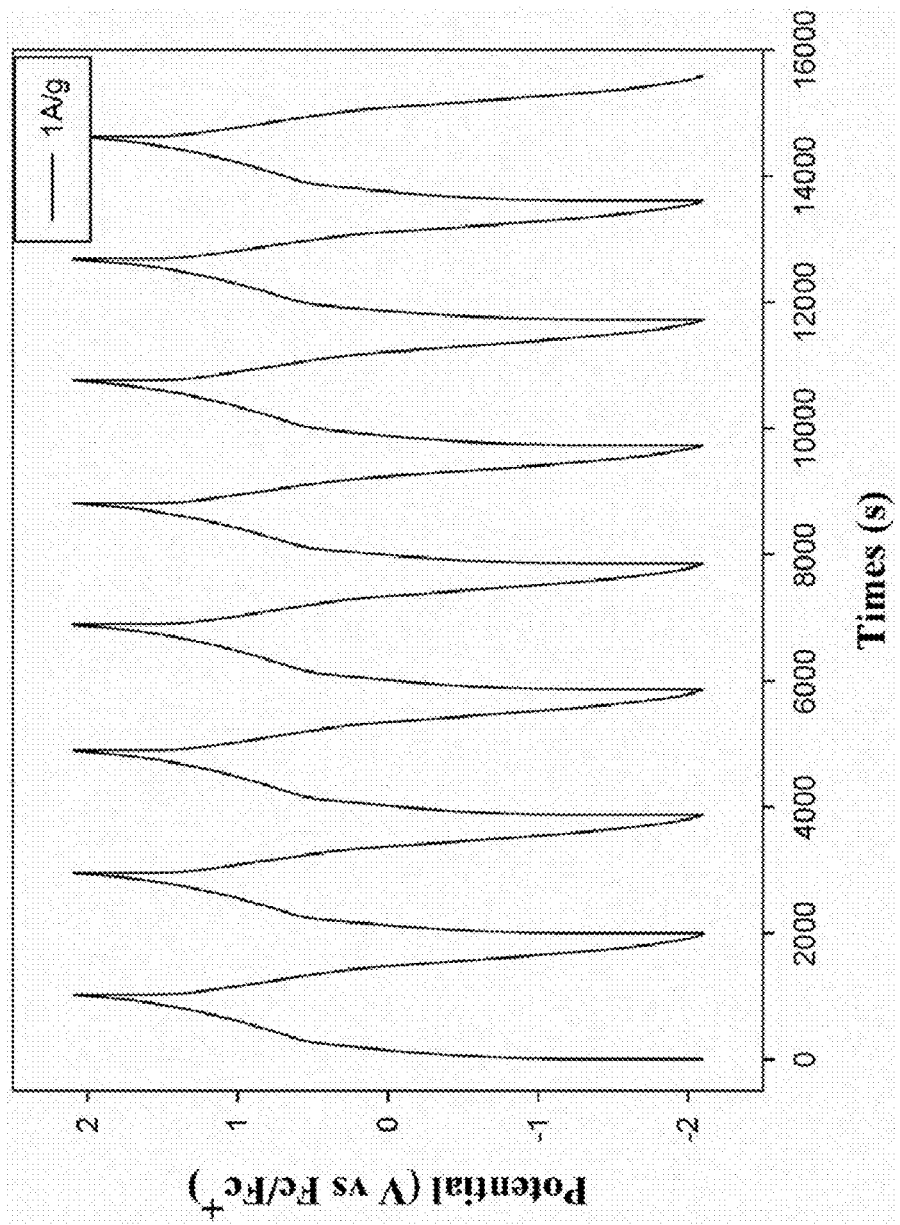
FIG. 10 shows a CP of the MNNF electrode for charge-discharge cycles in an applied potential from $-2.1V$ to $+2.1V$ and an applied current density of $\mp 1.0$ A $g^{-1}$ according to one embodiment of the present invention.

The electrochemical properties of the $V_2O_5$ nanosheets-coated titanium electrode in $LiClO_4$-acetamide IL were recorded with a chronopotentiogram (CP). The obtained CP of the $V_2O_5$ nanosheets-coated titanium electrode for charge-discharge cycles in an applied potential from −2.1V to +2.1V and an applied current density of ∓1.0 A g$^{-1}$ is shown in FIG. 10. The specific capacitance, measured at a sweep rate of 10 mV/s, was 240 F/g. The high electrode operating potential 4.2V in the $LiClO_4$-acetamide IL allows a superior energy density of 560 W h kg$^{-1}$ of the capacitor because the energy density relates mainly to the square of the cell operating voltage.

Embodiment 3

Another embodiment of the chemical energy storage system in the present invention comprises a positive electrode composed of $MnO_2$ nanowires and carbon fiber paper; a negative electrode composed of inert graphite disposed proximal to, but not in contact with, the positive electrode; a non-aqueous electrolyte including urea and $LiClO_4$; and a case accommodating the non-aqueous electrolyte, the positive electrode, and the negative electrode. The preparation of the $MnO_2$ nanowire-coated carbon fiber paper electrodes is described above, and includes application of a constant potential of 1 $mAcm^{-2}$ vs. SCE during the electrodeposition process.

Figure 11:
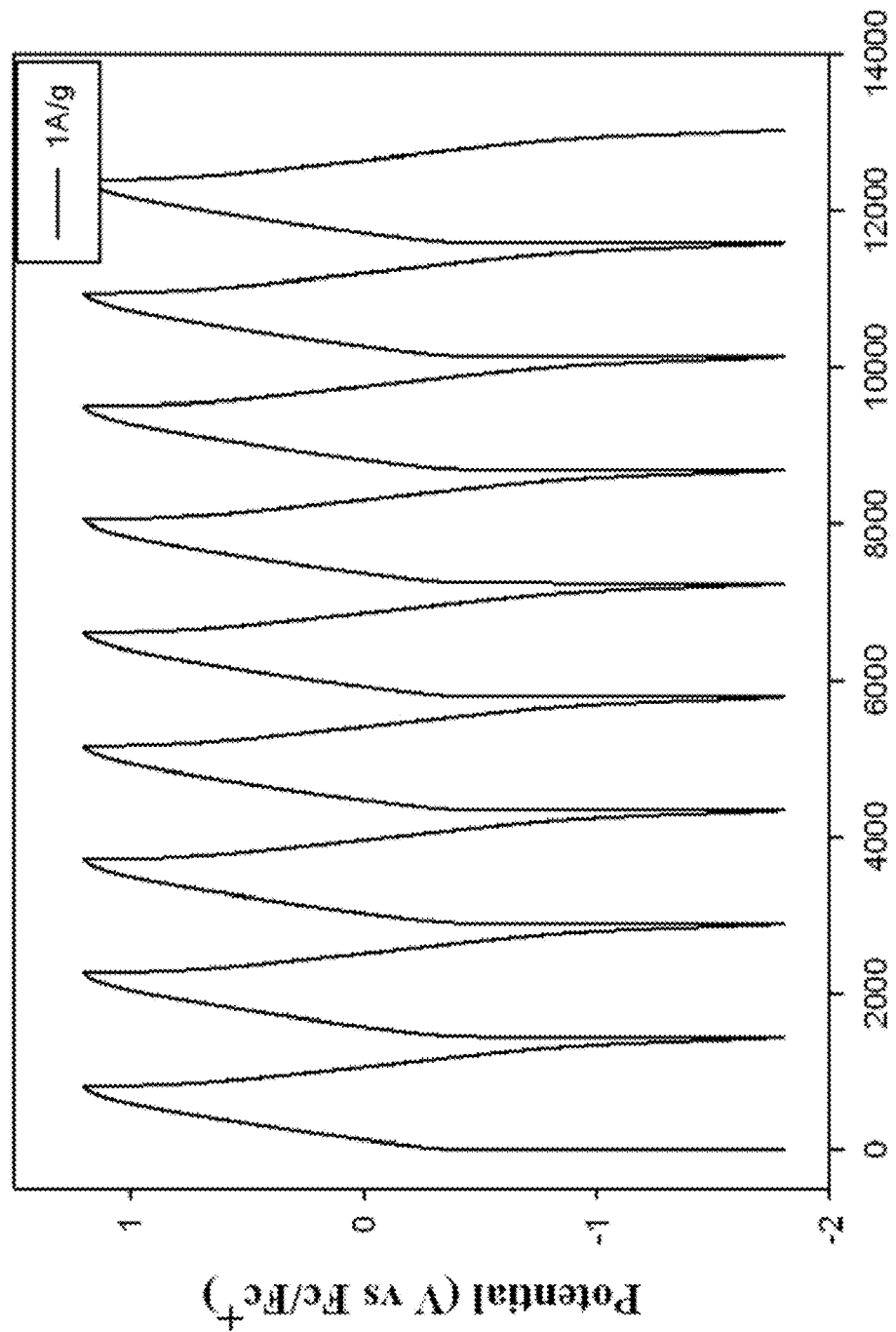
FIG. 11 shows a CP of the MNNF electrode for charge-discharge cycles in an applied potential from $-1.8V$ to $+1.2V$ and an applied current density of $\mp 1.0$ A $g^{-1}$ according to one embodiment of the present invention.

The electrochemical properties of the $MnO_2$ nanowire-coated carbon fiber paper electrode in $LiClO_4$-urea IL were recorded with a chronopotentiogram (CP). The obtained CP of the $MnO_2$ nanowire-coated carbon fiber paper electrode for charge-discharge cycles in an applied potential from $-1.8V$ to $+1.2V$ and an applied current density of $\mp 1.0$ A $g^{-1}$ is shown in FIG. 11. The specific capacitance, measured at a sweep rate of 10 mV/s, was 250 F $g^{-1}$. The high electrode operating potential 3.0V in the $LiClO_4$-urea IL allows a superior energy density of 315 W h $kg^{-1}$ of the capacitor because the energy density is related mainly to the square of the cell operating voltage.

Figure 12:
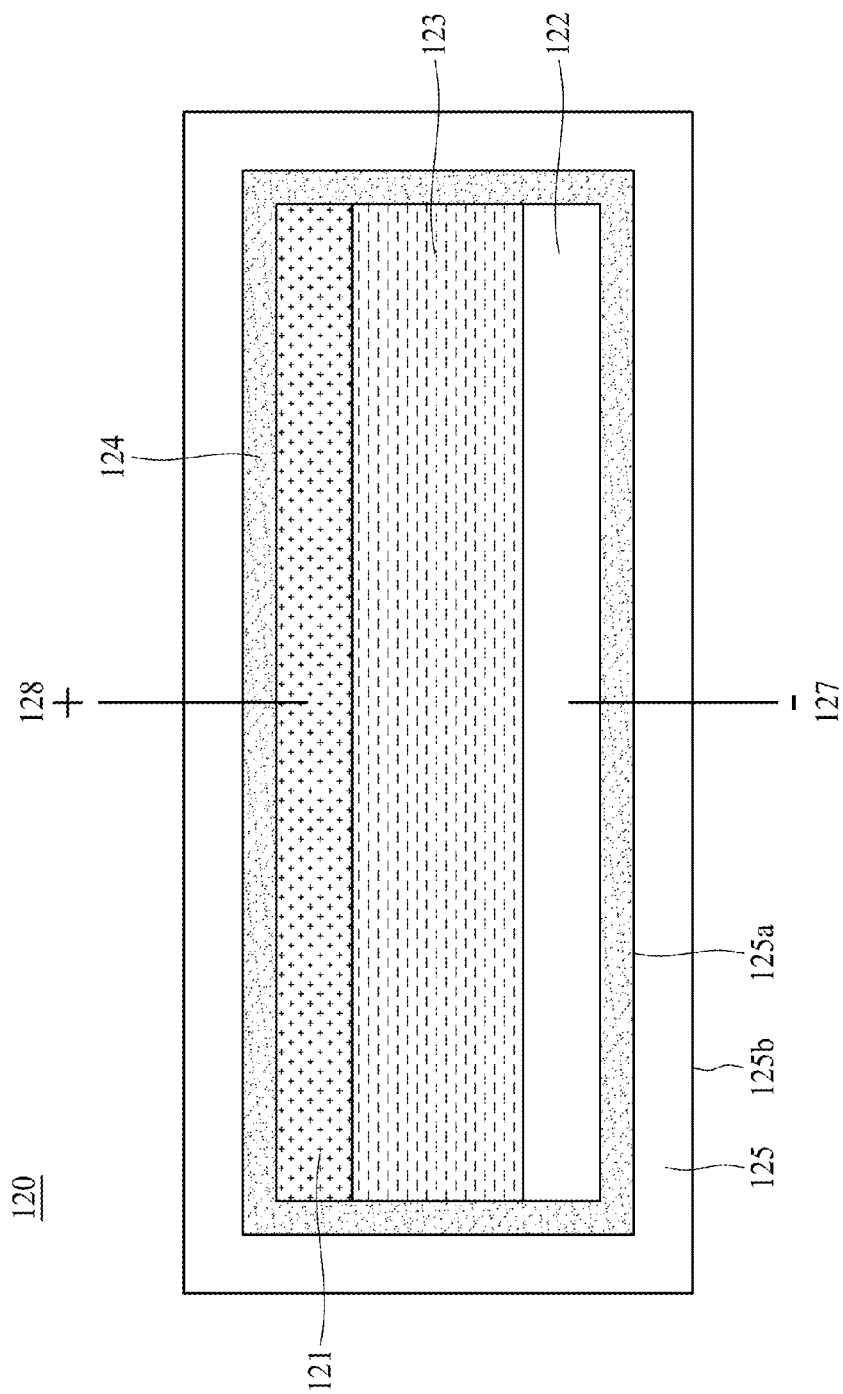
FIG. 12 shows an electrochemical energy storage system having a sealed container in one embodiment of the present invention.

FIG. 12 shows an electrochemical energy storage system 120 having a sealed container 125 in one embodiment of the present invention. The sealed container 125 has an inner surface 125a contacting the non-aqueous electrolyte 124 and an outer surface 125b not contacting the electrolyte 124. A positive contact 128 and a negative contact 127 are allowed to be either positioned at different regions of the outer surface 125b or extended out from the container 125 and reaching the object to be charged. The positive contact 128 is electrically connected with the positive electrode 121, and the negative contact 127 is electrically connected with the negative electrode 122. Since the sealed container possesses a compact nature, a separation layer 123 may further be positioned between the positive electrode 121 and the negative electrode 122, so as to prevent two electrodes from physically connecting with each other. The composition of the electrolyte 124, the positive electrode 121, and the negative electrode 122 can be selected from the materials described in the previous embodiments.

The performance of the chemical energy storage systems described in the present invention opens a new route for development of efficient systems to store energy using metal-oxide electrodes deposited on porous materials with ionic liquid electrolytes. If the results can be successfully scaled to a thickness of hundreds of microns without loss of performance, an MNNF electrode in $LiClO_4$-OZO IL electrolyte-based EC might be promising for applications in electric vehicles and heavy machinery that require rapid and high power energy storage systems.

Although the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A non-aqueous electrolyte for an electrochemical capacitor, comprising:
    organic compounds having at least one acylamino group; and
    lithium salts characterized as LiX, wherein Li is lithium and X comprises $SCN^-$;
    the organic compounds and the lithium salts are in solid state before mixing;
    the organic compounds are cyclic compounds; and
    the cyclic compounds comprise 2-oxazolidinone, ethyleneurea, or the combination thereof.

2. The non-aqueous electrolyte of claim 1, wherein the lithium salts and the organic compounds are mixed with molar ratios in a range of from 1:3 to 1:7, and wherein the molar ratios are the ratios of lithium salts to organic compounds in moles.

* * * * *